United States Patent
Côté et al.

(10) Patent No.: US 9,918,204 B1
(45) Date of Patent: Mar. 13, 2018

(54) HIGH ACCURACY INDOOR TRACKING

(71) Applicant: Bentley Systems, Incorporated, Exton, PA (US)

(72) Inventors: Stéphane Côté, Lac Beauport (CA); Francois Rheault, Lac-Etchemin (CA)

(73) Assignee: Bentley Systems, Incorporated, Exton, PA (US)

( * ) Notice: Subject to any disclaimer, the term of this patent is extended or adjusted under 35 U.S.C. 154(b) by 126 days.

(21) Appl. No.: 14/962,725

(22) Filed: Dec. 8, 2015

(51) Int. Cl.
  *H04W 4/04* (2009.01)
  *H04W 4/00* (2018.01)
  *H04W 4/02* (2018.01)

(52) U.S. Cl.
  CPC .......... *H04W 4/043* (2013.01); *H04W 4/005* (2013.01); *H04W 4/028* (2013.01)

(58) Field of Classification Search
  CPC .... H04W 4/043; G06T 19/006; H04N 9/3185
  See application file for complete search history.

(56) References Cited

U.S. PATENT DOCUMENTS

| | | | |
|---|---|---|---|
| 8,284,100 B2 | 10/2012 | Vartanian et al. | |
| 8,504,292 B1 | 8/2013 | Cote et al. | |
| 8,754,805 B2 | 6/2014 | Wang et al. | |
| 9,020,191 B2 | 4/2015 | Gupta et al. | |
| 9,600,933 B2 * | 3/2017 | Wu | G06T 19/006 |
| 2012/0158282 A1 | 6/2012 | Park | |
| 2014/0152809 A1 | 6/2014 | Jarvis | |
| 2014/0363797 A1 * | 12/2014 | Hu | G09B 5/02 434/236 |
| 2015/0015602 A1 * | 1/2015 | Beaudoin | G06T 7/0004 345/619 |
| 2015/0350618 A1 * | 12/2015 | Meier | H04N 9/3185 345/7 |

OTHER PUBLICATIONS

Khoshelham, Kourosh, et al., "Accuracy and Resolution of Kinect Depth Data for Indoor Mapping Applications," Sensors, Feb. 1, 2012, pp. 1437-1454.
Labbe, Mathieu, et al., "Appearance-Based Loop Closure Detection for Online Large-Scale and Long-Term Operation," IEEE, IEEE Transactions on Robotics, vol. 29, Issue 3, Feb. 11, 2013, pp. 1-12.

\* cited by examiner

*Primary Examiner* — Myron K Wyche
(74) *Attorney, Agent, or Firm* — Cesari and McKenna, LLP; James A. Blanchette (57) ABSTRACT

In one embodiment, a technique is provided for tracking a mobile device within a building. A course position estimate of the mobile device is determined using a positioning system. The course position estimate indicates a room in which the mobile device is located. One or more sensors of the mobile device capture a live point cloud of surroundings of the mobile device. Tracking software accesses a portion of a pre-captured point cloud of the interior of the building that serves as a reference. The portion of the pre-captured point cloud corresponds to the room indicated by the course position estimate. Once the initial pose is determined, an updated pose of the mobile device is determined when the mobile device is moved, based on a further comparison of the live point cloud to the portion of the pre-captured point cloud.

20 Claims, 4 Drawing Sheets

HIGH ACCURACY INDOOR TRACKING

BACKGROUND

Technical Field

The present disclosure relates generally to tracking a mobile device within a building, and more specifically to techniques for high-accuracy building-wide indoor tracking for use, for example, with augmented reality (AR).

Background Information

AR has been proposed as a tool for planning and maintaining infrastructure (e.g., electrical wiring, water and sewage pipes, ventilation ducts, etc.) in buildings (e.g., residential structures, commercial structures, plants, facilities, etc.). Often the configuration of the infrastructure is highly complex. Further, many portions of the infrastructure may be hidden from view (e.g., located inside walls, behind equipment, etc.). Augmented reality (AR) may be used to locate hidden infrastructure, identify infrastructure components, display related status and maintenance information (e.g., operational status, maintenance histories, instructions for repair tasks, etc.), and visualize modifications or additions to the infrastructure, among other uses. In a typical use case, a camera of a mobile device (e.g., an ultra-mobile personal computer (UMPC), tablet computer, smartphone, etc.) captures a view of the indoor environment, which is fed as a stream of frames to an AR application. The AR application supplements the frames from the camera with computer-generated graphics and/or text, overlaying these at selected locations in the frames, to produce an AR view. The AR view is displayed to a user, for example, on a display screen of the mobile device. As the user moves the mobile device about the environment, and points the camera towards different infrastructure, the AR view is updated so they can observe different portions of the infrastructure.

In order to overlay the correct graphics and/or text at the correct locations to create the AR view, it is necessary to track the pose (i.e., position an orientation) of the mobile device to a high-degree of accuracy, for example, on the order of millimeters. Lesser accuracy may lead to graphics and/or text being overlaid at incorrect locations, and may substantially reduce the benefits of an AR view. Such tracking should be reliable, so that tracking errors (e.g., the tracking system becoming "confused" and reporting a dramatically incorrect pose) are extremely rare. This may be especially important when working with hazardous components (e.g., pipes transporting high temperature, high pressure, or otherwise hazardous liquids or gasses), as an incorrect AR view caused by a tracking error may lead to injuries or property damage.

Conventional general-purpose positioning techniques are generally unsuited for use in AR tracking, as they are incapable of the high-degree of accuracy required. For example, conventional Wi-Fi positioning, Bluetooth positioning, radio frequency identification (RFID) positioning, barcode-based positioning, etc. are generally only capable of room-level accuracy; not the millimeter-level accuracy generally required by AR. Further, general-purpose positioning techniques that rely upon electromagnetic signal propagation (e.g., Wi-Fi positioning, Bluetooth positioning, etc.) may be unreliable in indoor environments due to multi-path interference and other factors.

Several specialized techniques have been proposed that try to achieve the high-degree of accuracy and reliability required for AR. However, such techniques have suffered various shortcomings that have limited their applicability to building-wide indoor tracking. One technique proposed for use with AR is feature-based machine vision tracking. In a typical feature-based machine vision tracking system, machine vision routines are applied to a view captured by a camera, and attempt to calculate a pose of the camera in relation to unique features visible in the view. If a sufficient number of unique features are available, such techniques may operate well. However, many indoor environments suffer a shortage of unique features. Indoor environments are often composed of uniform surfaces (e.g., walls, floors, ceiling, etc. having a uniform color and texture). Further, indoor environments may be homogenous from one room to the next, with each room having identical elements (e.g., identically windows, doors, furniture, etc.). Typical feature-based machine vision tracking systems may have difficulty distinguishing between a view of elements in one room and a view of identical elements in another room. Compounding these issues, the camera used to capture the view of the environment in many feature-based machine vision systems has a limited field of view. By looking to only a small portion of the environment, the chance that a uniform surface will consume a substantial portion of the view, or that the view will include mainly homogenous elements is greatly increased. As a result, feature-based tracking may provide lower than expected accuracy, and experience higher-than desired rates of tracking errors, when used in building-wide indoor tracking.

Another technique proposed for use with AR is infrared marker-based tracking. In a typical infrared marker-based tracking system, markers (e.g., a set of spheres) are rigidly attached to a mobile device to be tracked. The environment is instrumented with multiple infrared cameras that detect the markers. A software routine calculates the position of the markers with respect to the cameras (e.g., via triangulation), and from this calculates pose of the mobile device. Using infrared marker-based tracking, sub-millimeter accuracy is possible with acceptable reliability. However, the need to pre-instrument the environment renders the technique poorly suited for building-wide indoor tracking. Each room would need to be pre-instrumented with multiple infrared cameras, multiplying costs and requiring extensive setup before an AR application could be used in the building. Such requirements render the technique impractical for many commercial applications.

Accordingly, there is a need for improved techniques for building-wide indoor tracking of a mobile device that may provide the accuracy and reliability required by AR.

SUMMARY

Example techniques are provided for high-accuracy, reliable building-wide indoor tracking of a mobile device. The techniques utilize a combination of a course position estimate provided by a general-purpose positioning system, and fine pose estimation based on a comparison of point clouds. The course position estimate indicates a room of the building in which the mobile device is located. The comparison of point clouds compares a live point cloud captured by sensor(s) of the mobile device with a portion of a pre-captured point cloud corresponding to the room indicated by the course position estimate, and yields poses of the mobile device that produces the best matches. The poses may be provided to an AR application, and used to produce an AR view of the interior of the building.

In one specific example embodiment, prior to tracking a mobile device in a building, a pre-captured point cloud of the interior of the building is obtained using a scanning device. The pre-captured point cloud serves as a known reference for comparison. When there is a need to track the mobile device in the building, a general-purpose positioning system (e.g., a Wi-Fi positioning system, a Bluetooth positioning system, a radio frequency identifier (RFID) positioning system, a barcode-based positioning system, etc.) is used to determine a course position estimate of the mobile device that indicates a room of the building in which the mobile device is currently located. Further, an orientation sensor of the mobile device determines a course orientation estimate of the mobile device. One or more further sensors (e.g., three red, green, blue and depth (RGB-D) cameras arranged in orthogonal directions or an alternatives arrangement of one or more different types of sensors) of the mobile device capture data streams of the mobile device's surroundings, which are merged, down sampled and reoriented (e.g., based on the course orientation estimate) to produce a live point cloud of the surroundings of the mobile device.

Tracking software on the mobile device accesses a portion of the pre-captured point cloud corresponding to the room determined by the course positioning system. If this is a new room for the mobile device, the tracking software initializes tracking by determining an initial pose of the mobile device. The tracking software first assumes the mobile device is located at each of a plurality of potential positions within the indicated room (e.g., distributed at a uniform density, for instance, according to a grid pattern). The tracking software applies an iterative closest point (ICP) algorithm that compares the live point cloud positioned at each of the potential positions against the portion of the pre-captured point cloud, and attempts to determine a transformation (i.e., a translation and rotation) that when applied to the live point cloud causes it to best match the portion of the pre-captured point cloud. The ICP algorithm converges to a transformation for at least some of the potential positions. Each transformation is associated with an ICP fitness score that quantifies the match. The tracking software selects a transformation with the highest ICP fitness score, and calculates the initial pose of the mobile device based on the selected transformation. The initialization is repeated each time the mobile device moves to another room to generate a new initial pose.

If the mobile device is in the same room as a most recently determined pose (e.g., an initial pose or previously determined updated pose), the tracking software determines updated poses based on further comparisons of the live point cloud to the portion of the pre-captured point cloud corresponding to the room indicated by the course position estimate. For each updated pose, the tracking software assumes the mobile device is located at the most recently determined pose, and applies the ICP algorithm to compare the live point cloud positioned according to the most recently determined pose to the portion of the pre-captured point cloud corresponding to the room indicated by the course position estimate. The ICP algorithm operates to determine a transformation that when applied to the live point cloud causes it to best match the portion of the pre-captured point cloud, and the tracking software calculates the updated pose of the mobile device based on the transformation. The tracking operations are repeated each time the mobile device moves within the room to generate new updated poses.

The tracking software provides the determined poses to an AR application executing on the mobile device, which displays an AR view of the interior of the building based on the poses. In such manner, tracking is available to the AR application without requiring instrumentation in all rooms of the building.

It should be understood that a variety of additional features and alternative embodiments may be implemented other than those discussed in this Summary. This Summary is intended simply as a brief introduction to the reader, and does not indicate or imply that the examples mentioned herein cover all aspects of the invention, or are necessary or essential aspects of the invention.

BRIEF DESCRIPTION OF THE DRAWINGS

The detailed description below refers to the accompanying drawings, of which.

DETAILED DESCRIPTION

Definition of Terms

As used herein the term "mobile device" should be understood to refer to an electronic device readily transportable by a user, for example, adapted to be carried by the user on their person. A "mobile device" may be a UMPC, a tablet computer, a smartphone, or other similar type of electronic device.

As used herein the term "course position estimate" should be understood to refer a position estimate having accuracy no greater than on the order of centimeters, and most often on the order of meters or tens of meters. A "course position estimate" may be sufficiently accurate to indicate a room of a building, but typically is insufficiently accurate for direct use in generating an AR view.

As used herein the phrases "pose of a mobile device", "mobile device's pose" or other equivalents should be understood to refer to the pose of a camera or other sensor of the mobile device, whose output is used by an application, for example, an AR application. Typically, the camera or other sensor will he rigidly mounted to the casing of the mobile device, such that the pose of the casing and the pose of camera or other sensor are the same. However, should the camera or other sensor be allowed to rotate or otherwise articulate with respect to the casing of the mobile device, it should be understood that the pose of the camera is what is of interest.

Example Embodiments

Figure 1:
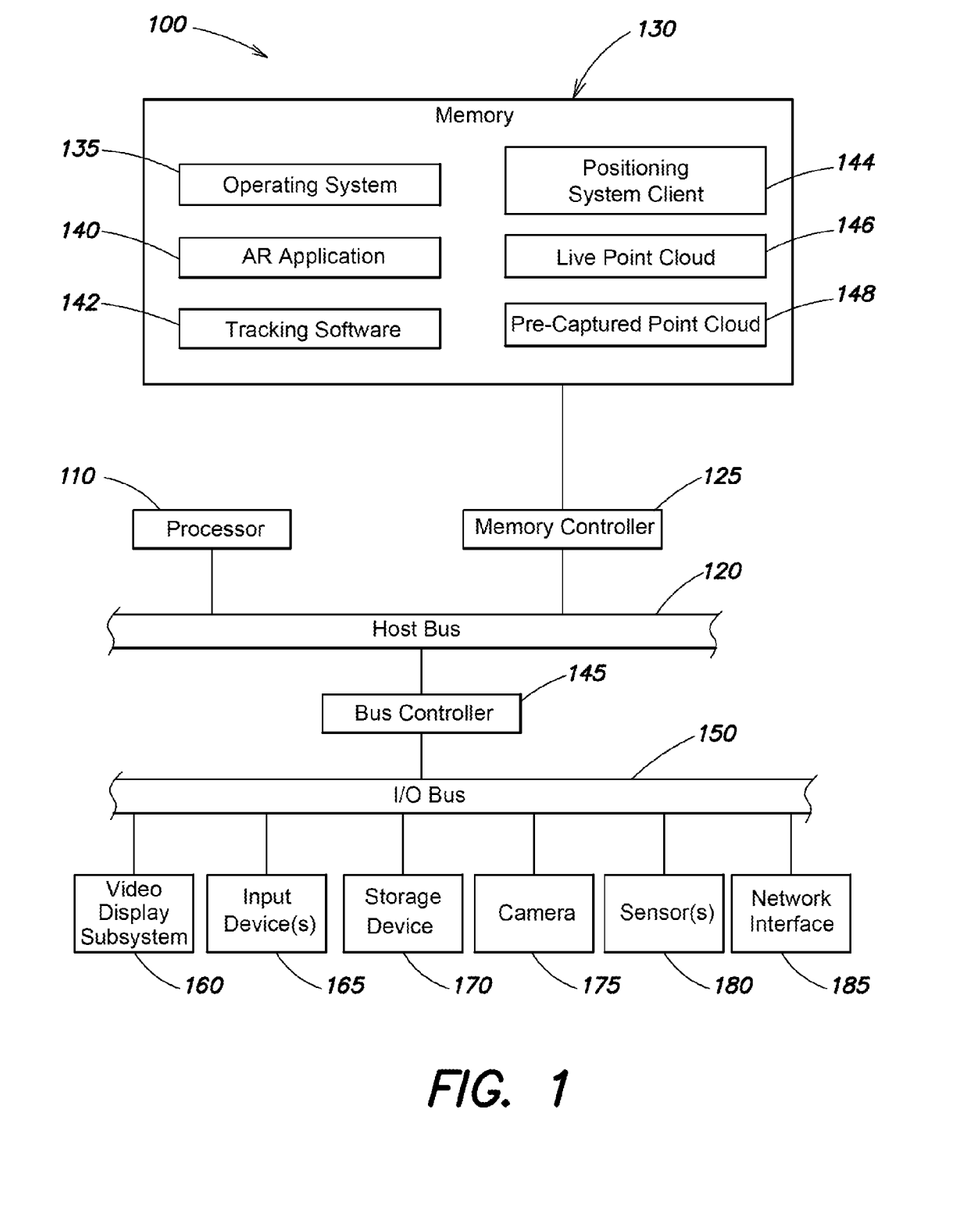
FIG. 1 is a schematic block diagram of an example mobile device that may be used with at least some of the presently described techniques for high-accuracy, reliable indoor tracking.

FIG. 1 is a schematic block diagram of an example mobile device 100 that may be used with at least some of the presently described techniques for high-accuracy, reliable indoor tracking. The mobile device 100 includes at least one processor 110 coupled to a host bus 120. A volatile memory 130, such as a random access memory (RAM), is coupled to the host bus 120 via a memory controller 125 and configured to store an in-memory copy of software and data. The in-memory copy of software may include an operating system 135, an AR application 140, tracking software 142, and a positioning system client 144, among other software.

The operating system may be a commercially available mobile operating system (e.g., an iOS® operating system, an Android® operating system, etc.). Alternatively, the operating system may be an operating system adapted for a desktop computing environment (e.g., a Windows® operating system).

The AR application 140 may be part of a building information modeling (BIM) software environment that produces an AR view of an interior portion of a building. The AR view may provide information related to building infrastructure (e.g., identifying the locations of hidden infrastructure, identifying types of infrastructure components, displaying status and maintenance information, etc.) overlaid frame-by-frame upon a view captured by a camera 175 of the mobile device.

The tracking software 142 operates to consume a course position estimate and a course orientation estimate of the mobile device 100 and produces a fine-grain position and orientation estimate (a "pose") having accuracy sufficient for use by the AR application 140 (e.g., accuracy on the order of millimeters, or better). The tracking software 142 may be a standalone application, or a portion (e.g., a process or library) of the AR application 140.

The positioning system client 144 is a part of a general-purpose positioning system that is capable of producing a course position estimate for the mobile device. The positioning system client may perform the actual position estimation, or may issue a request to software executing on another electronic device to perform the position estimation, and receive back results. Depending on the implementation, the general-purpose positioning system may take any of a variety of different forms. For example, the general-purpose positioning system may be a Wi-Fi positioning system that uses a network interface 185 of the mobile device 100 to detect Wi-Fi signals from wireless access points having known positions, and uses the signals to estimate the position of the mobile device 100 by considering received signal strengths, signal fingerprint, angles of arrival, times of flight and/or other factors. Alternatively, the general-purpose positioning system may be a Bluetooth positioning system that uses a network interface 185 of the mobile device 100 to detect Bluetooth signals from beacons and estimates the position of the mobile deco vice 100 based on the known positions of a nearby beacon (e.g., assuming its position as that of the mobile device). In still another alternatively, the general-purpose positioning system may be an RFID positioning system, where a user scans an RFID tag using the mobile device 100 (e.g., with a radio frequency (RF) scanner (not shown)), and the system adopts a known position of the RFID tag as that of the mobile device. In yet another alternative, the course positioning system may be a barcode-based positioning system where a user scans a barcode (e.g., a quick response (QR) code) tag using the mobile device 100 (e.g., with the camera 175), and the system adopts a known position of the barcode as that of the mobile device.

The in-memory copy of data may include an in-memory copy of a live point cloud 146 and a pre-captured point cloud 148. The live point cloud 146 represents the current surroundings of the mobile device as a set of data points produced from data stream(s) captured by one or more sensors 180 of the mobile device 100. As the mobile device 100 is moved about within the building, the pose from which the live point cloud 146 is captured will change. The pre-captured point cloud 148 represents the interior of the building as a set of data points captured by a scanning device (not shown) from known positions, or, alternatively, generated directly from a BIM model of the building. When a scanning device is used, it may take the form of a laser scanner, a RGB-D camera, or other types of sensor that are operated manually, or incorporated into a scanning robot or drone (not shown).

Returning to the hardware components of FIG. 1, the host bus 120 of the mobile device 100 is coupled to an input/output (I/O) bus 150 through a bus controller 155. A video display subsystem 160 that includes a display screen is coupled to the I/O bus 150. The display screen may show a user interface of the AR application 140, as well as user interfaces of other software executed on the mobile device 100. One or more user input devices 165 (e.g., a touch sensor of the display screen, buttons, a keyboard, etc.) are also coupled to the I/O bus 150. The input devices 165, among other uses, are used to interact with the AR application 140. The above-discussed non-volatile storage device 170, camera 175, sensor(s) 180, and wireless network interface 185 are also coupled to the I/O bus 150. The non-volatile storage device 170 may be a hard disk drive, a solid-state drive, or other type of persistent data store. In some cases, the camera 175 may be one of the sensor(s) 180 and perform a dual role in both view capture and pose determination. Alternatively, the camera 175 may be a completely separate digital camera. The sensor(s) 180 may be configured to capture a course orientation of the mobile device, and the live point cloud 146. In one implementation, the sensor(s) 180 may include an orientation sensor responsible for capturing the course orientation, and a plurality of (e.g., 3) RGB-D cameras with limited fields of view that capture RGB-D data streams in defined directions (e.g., that capture RGB-D data streams in orthogonal directions), which are merged, down sampled, and reoriented to produce the live point cloud 146. Alternatively, one or more different types of sensors may be used to capture the live point cloud 146, for example, a single 360 degree depth camera. It should be understood that, depending on the implementation, the types of sensors used, the number of sensors, and the direction these sensors are pointed in, may vary.

The wireless network interface 185 may be a Wi-Fi interface, a Bluetooth interface or other type of interface. In addition to its use by a general-purpose positioning system, the wireless network interface 185 may permit various distributed, collaborative or remote computing configurations. It should be understood that, according to such configurations, some, or all, of the software and data shown resident in memory 130 or stored in the non-volatile storage device 170 may be remotely located on another electronic device, and accessed via the wireless network interface 185.

Figure 2A:
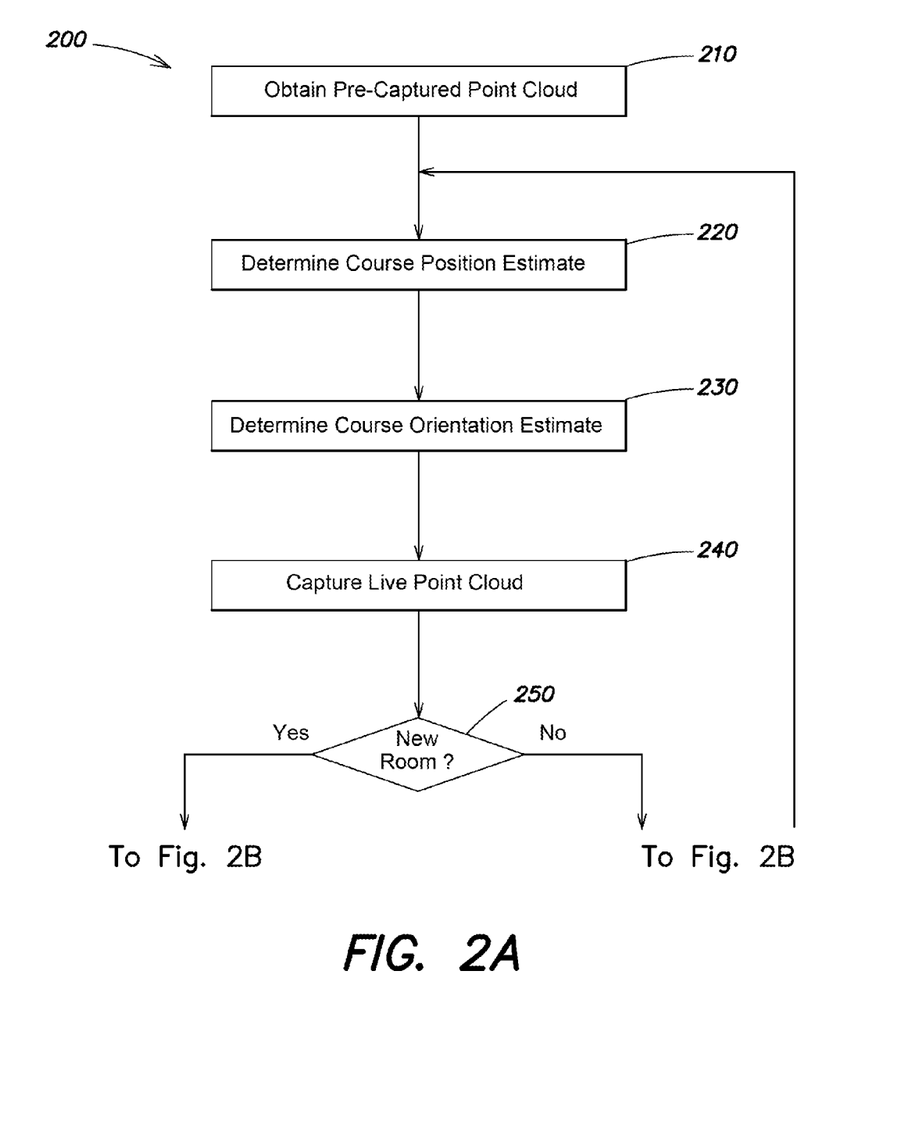
FIGS. 2A and 2B are a flow diagram of an example sequence of steps for high-accuracy, reliable indoor tracking and generation of an AR view.
Figure 2B:
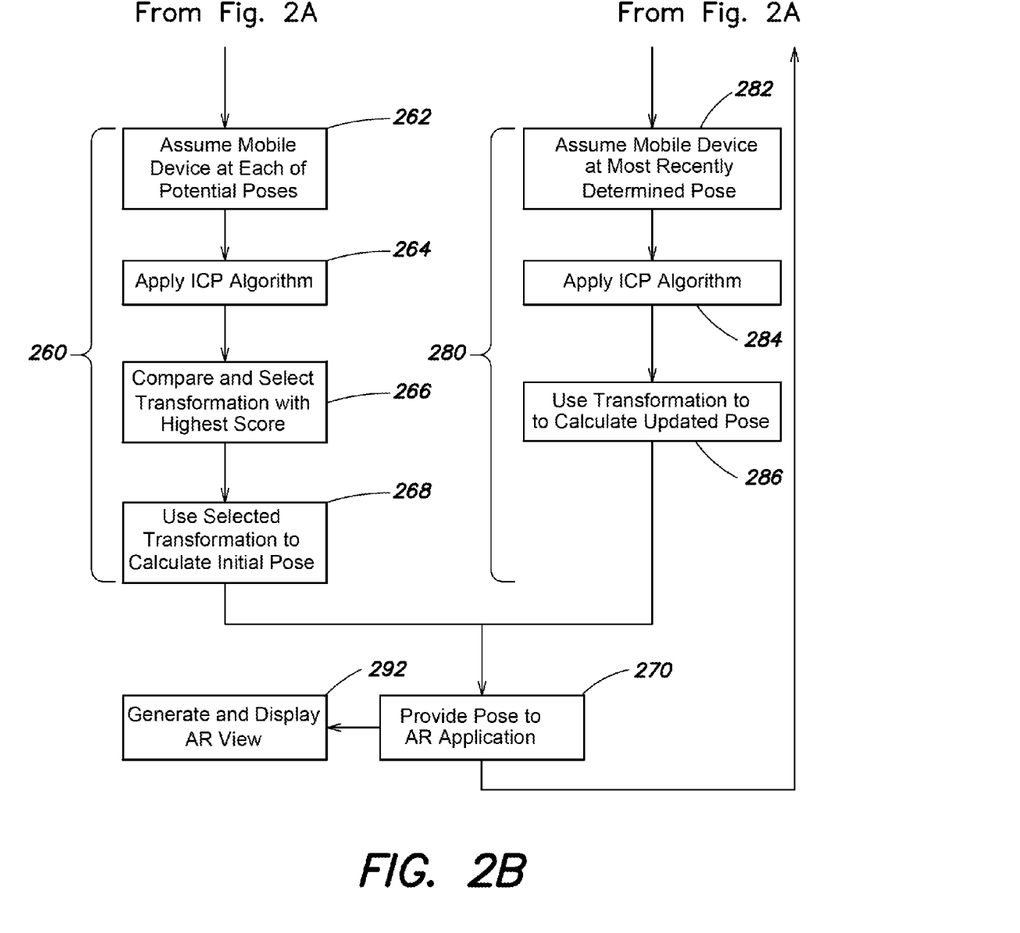

FIGS. 2A and 2B are a flow diagram of an example sequence of steps 200 for high-accuracy, reliable indoor tracking and generation of an AR view. At step 210, a pre-captured point cloud 148 of the interior of a building is obtained using a scanning device or, alternatively, generated directly from a BIM model of the building. When using a scanning device, a real-time appearance-based mapping (RTAB-Map) system may be employed. Capturing the point cloud 148 from the building may provide advantages over generation from a BIM model, as it may represent rooms "as built" and may include details such as furniture, wall hangings, etc. that are often not present in a BIM model. The pre-captured point cloud 148 may be loaded into memory 130 of the mobile device 100.

At step 220, a course position estimate that indicates a room of the building is determined by a general-purpose positioning system (e.g., a Wi-Fi positioning system, a Bluetooth positioning system, a RFID positioning system, a barcode-based positioning system, etc.). The actual position estimation calculation may be performed by the positioning system client 144 itself, or by remote software of the positioning system, and provided to the client 144, in response to a request from the client 144.

At step 230, a course orientation estimate of the mobile device 100 is determined using one of the sensor(s) 180 of the mobile device (e.g., using an orientation sensor of the sensor(s) 180).

At step 240, a live point cloud 146 of the surroundings of the mobile device 100 is captured using the sensor(s) 180 of the mobile device. In an implementation where the sensor(s) 180 include a plurality of (e.g., 3) RGB-D cameras that capture RGB-D data streams in defined directions (e.g., that capture RGB-D data streams in orthogonal directions), step 240 may include processing operations to unify the data streams. For example, as part of step 240, the tracking software 142 may merge the RGB-D data streams to produce a merged (i.e., unified) data stream, down sample the merged data stream (e.g., to 10 cm density), and reorient the merged data stream based on the course orientation estimate from step 230. Alternatively, in different implementations, that, for example, involve only a single sensor, or sensor that already captures data at a desired resolution or in a desired orientation, merging, downsampling and/or reorienting may not be required.

At step 250, a determination is made whether the mobile device 100 is in a new room, or is in the same room as a most recently determined pose.

If the mobile device 100 is in a new room, execution proceeds to group of steps 260, where tracking is initialized. Such initialization is performed by comparing the live point cloud 146 to a portion of the pre-captured point cloud 148 corresponding to the room indicated by the course position estimate, to determine an initial pose of the mobile device 100 within the room. The group of steps 260 begins with step 262, where the tracking software 142 assumes the mobile device 100 is at each of a plurality of potential positions distributed at a uniform density throughout the room (e.g., according to a grid pattern, for example, a 1-meter grid). The potential positions may be distributed across an x-y plane in the room, with the position in the z-plane being determined by an upward facing one of the sensor(s) 180. Alternatively, the potential positions may be distributed through all dimensions of space. At step 264, the tracking software 142 applies an ICP algorithm that compares the live point cloud 146 positioned at each of the potential positions against the portion of the pre-captured point cloud 148 corresponding to the room indicated by the course position estimate from step 230. The ICP algorithm operates to determine a transformation (i.e., a translation and rotation) that when applied to the live point cloud 146 causes it to best match the portion of the pre-captured point cloud 148 corresponding to the room indicated by the course position estimate.

Figure 3:
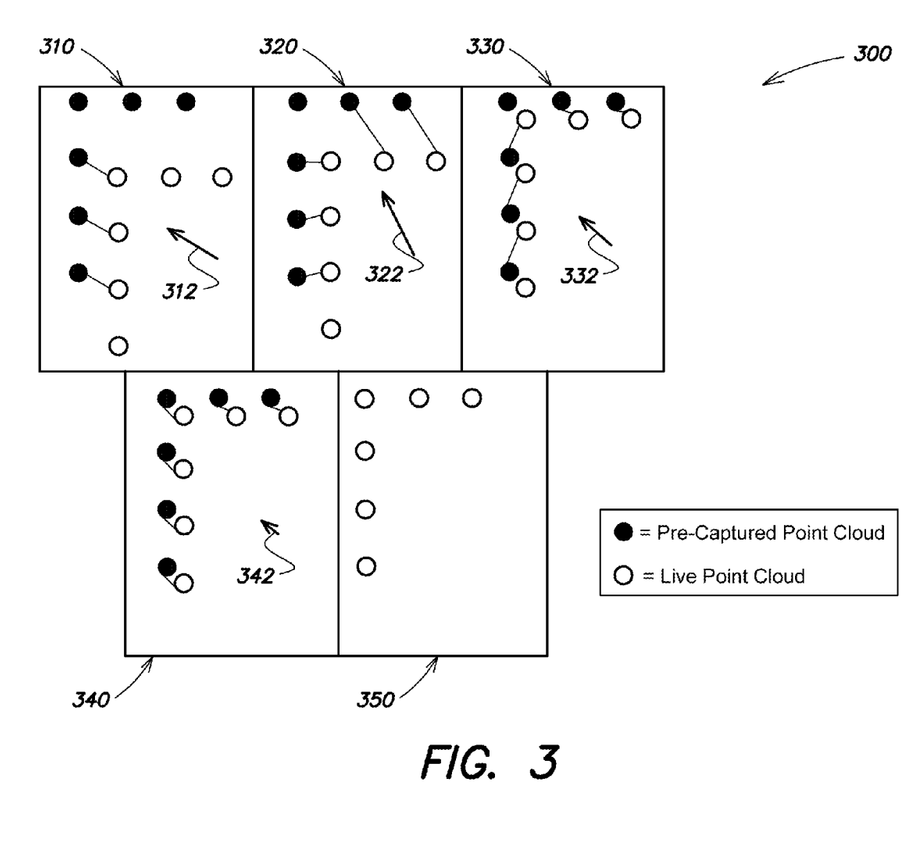
FIG. 3 is a diagram illustrating example operations of an ICP algorithm.

FIG. 3 is a diagram 300 illustrating example operations of an ICP algorithm. Initially, points of the live point cloud 146 and points of the portion of the pre-captured point cloud 148 corresponding to the room indicated by the course position estimate diverge significantly. The ICP algorithm iteratively applies and revises a transformation to improve a match between the points of the live point cloud 146 and those of the portion of the pre-captured point cloud 148 corresponding to the room indicated by the course position estimate. The match is evaluated by a function (e.g., a mean squared error function) and quantified as an ICP fitness score. For example, in iteration 310, the ICP algorithm applies a transformation 312 to bring the points of the live point cloud 146 closer to those of the portion of the pre-captured point cloud 148 corresponding to the room indicated by the course position estimate. This produces a first fitness score. At iteration 320, the initial transformation is revised by adding a further transformation 322, which yields a second fitness score. This process continues, through iterations 330, 340, 350 etc. and revisions 332, 342, etc. to eventually converge to a transformation. While five iterations are shown in FIG. 3, it should be understood that this is merely for purposes of illustration, and actual implementations typically perform a greater number of iterations. The ICP algorithm may be considered to have converged to a transformation when a pre-determined number of iterations (e.g., 30 iterations) have been reached, a certain fitness score is achieved, or other criteria are met (or fail to be met) indicating further iterations will not likely significantly improve the match.

At step 266, the transformations produced by the ICP algorithm for each of the potential positions are compared, and the transformation with the highest ICP fitness score is selected. At step 268, the selected transformation is used to calculate the initial pose of the mobile device 100. Since the pre-captured point cloud 148 is a known reference (e.g., captured from a known position, or directly from a BIM model), once an appropriate transformation is determined indicating the difference between the what the mobile device is observing and the known reference, the pose of the mobile device 100 may be readily calculated (e.g., by matrix multiplication). At step 270, the initial pose is provided to an AR application 140 executing on the mobile device 100. Execution may then loop back to step 220.

If at step 250 the mobile device 100 is instead in the same room as a most recently determined pose, execution proceed to group of steps 280, where ongoing tracking in the room is performed. Such ongoing tracking is performed by comparing the live point cloud 146 to the portion of the pre-captured point cloud 148 corresponding to the room indicated by the course position estimate to determine an updated pose of the mobile device 100. At step 282, the tracking software 142 assumes the mobile device 100 is at a most recently determined pose (e.g., the initial pose or previously determined updated pose, as the case may be). At step 284, the tracking software 142 applies the ICP algorithm to compare the live point cloud 146 positioned at the most recently determined pose to the portion of the pre-captured point cloud 148 corresponding to the room indicated by the course position estimate. As before, an ICP algorithm operates to determine a transformation that when applied to the live point cloud 146 causes it to best match the portion of the pre-captured point cloud 148 corresponding to the room indicated by the course position estimate. At step 286, the transformation produced when the ICP algorithm converges is used to calculate the updated pose of the mobile device 100. At step 270, the updated pose is provided to an AR application 140 executing on the mobile device 100. Execution may then loop back to step 220.

At step 290, which may occur concurrently with other of the steps, the AR application generates and displays on a display screen of the mobile device 100 an AR view of the interior of the building based on the initial pose and the updated poses.

CONCLUDING COMMENTS

It should be understood that various adaptations and modifications may be made to the above discussed techniques for high-accuracy racking a mobile device 100 within a building. While it is discussed above that the determined poses may be used with an AR application 140 to display an AR view of the interior of a building, it should be understood that the poses produced by the technique may be utilized by other types of applications, unrelated to AR. Further, while it is discussed above that a course position estimate is determined by a general-purpose positioning system, it should be understood that a course position estimate may be determined by another type of positioning system or manually provided, for example, by a user entering an indication of a room into a user interface. Further, it should be understood that at least some of the functionality stated above to be implemented in software may be implemented in hardware. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above embodiments are meant to be taken only by way of example.

What is claimed is:

1. A method for tracking a mobile device within a building, comprising
   determining a course position estimate of the mobile device using a positioning system, the course position estimate indicating a room of a plurality of rooms of the building in which the mobile device is located;
   capturing a live point cloud of surroundings of the mobile device using one or more sensors of the mobile device;
   accessing a portion of a pre-captured point cloud of the interior of the building that serves as a reference, the portion of the pre-captured point cloud corresponding to the indicated room;
   determining, by tracking software executing on the mobile device, an initial pose of the mobile device, based on a comparison of the live point cloud to a portion of the pre-captured point cloud corresponding to the indicated room; and
   determining, by the tracking software executing on the mobile device, updated poses of the mobile device when the mobile device is moved, based on further comparison of the live point cloud to the portion of the pre-captured point cloud corresponding to the indicated room.

2. The method of claim 1, further comprising:
   providing the initial pose and the updated poses to an augmented reality (AR) application; and
   displaying, by the AR application on a display screen of the mobile device, an AR view of the interior of the building based on the initial pose and the updated poses.

3. The method of claim 1, wherein the positioning system used to determine the course position estimate is a Wi-Fi positioning system, a Bluetooth positioning system, a radio frequency identifier (RFID) positioning system or a barcode-based positioning system.

4. The method of claim 1, wherein the one or more sensors of the mobile device are a plurality of sensors, and the capturing the live point cloud further comprises:
   capturing a plurality of data streams from the plurality of sensors; and
   merging the data streams to produce a merged data stream.

5. The method of claim 4, wherein each of the plurality of sensors comprises a red, green, blue and depth (RGB-D) camera, and the plurality of data streams are RGB-D video streams.

6. The method of claim 4, wherein the capturing the live point cloud further comprises:
   down sampling the merged data stream.

7. The method of claim 4, wherein the method further comprises:
   determining a course orientation estimate of the mobile device using an orientation sensor; and
   reorienting the merged data stream based on the course orientation estimate.

8. The method of claim 1, wherein the determining the initial pose further comprises:
   assuming the mobile device is at each of a plurality of potential positions within the indicated room;
   applying an algorithm that compares the live point cloud positioned at each of the potential positions against the portion of the pre-captured point cloud, each comparison yielding a transformation associated with a score that indicates how closely the live point cloud, when so transformed, matches the portion of the pre-captured point cloud;
   selecting a transformation having a highest score; and
   calculating the initial pose from the selected transformation.

9. The method of claim 8, wherein the algorithm is an iterative closest point (ICP) algorithm and the score is an ICP fitness score.

10. The method of claim 8, wherein the plurality of potential positions are distributed at a uniform density throughout the indicated room.

11. The method of claim 1, wherein the determining the updated poses further comprises:
   for each updated pose,
      assuming the mobile device is at a most recently determined pose, the most recently determined pose being the initial pose or a previously determined updated pose,
      applying an algorithm that compares the live point cloud positioned at the most recently determined pose against the portion of the pre-captured point cloud, the comparison yielding a transformation, and
      calculating the updated pose from the transformation.

12. The method of claim 11, wherein the algorithm is an iterative closest point (ICP) algorithm.

13. A non-transitory device-readable medium having software stored thereon, the software when executed on one or more processors of a mobile device being operable to:
   determine a course position estimate of a mobile device, the course position estimate indicating a room of a plurality of rooms of a building in which the mobile device is located;
   capture a live point cloud of surroundings of the mobile device;
   determine an initial pose of the mobile device using an iterative closest point (ICP) algorithm that compares the live point cloud against a portion of a pre-captured point cloud of the building that serves as a reference, the portion of the pre-captured point cloud corresponding to the indicated room; and determine updated poses of the mobile device using the ICP algorithm when the mobile device is moved in the indicated room.

14. The non-transitory electronic device readable medium of claim 13, wherein the software when executed is further operable to:

providing the initial pose and the updated poses to an augmented reality (AR) application that uses the initial pose and the updated poses to produce an AR view of the interior of the building.

15. The non-transitory electronic device readable medium of claim 13, wherein the course position estimate of the mobile device is provided by a Wi-Fi positioning system, a Bluetooth positioning system, a radio frequency identifier (RFID) positioning system or a barcode-based positioning system.

16. The non-transitory electronic device readable medium of claim 13, wherein the software that when executed is operable to capture the live point cloud is further operable to:

produce the live point cloud from one or more data streams from one or more sensors, each sensors including a red, green, blue and depth (RGB-D) camera.

17. The non-transitory electronic device readable medium of claim 13, wherein the software that when executed is operable to determine the initial pose of the mobile device is further operable to:

assume the mobile device is at each of a plurality of potential positions;

apply the ICP algorithm to compare the live point cloud positioned at each of the potential positions against the portion of the pre-captured point cloud, each comparison yielding a transformation associated with an ICP fitness score that indicates how closely the live point cloud, when so transformed, matches the portion of the pre-captured point cloud;

select a transformation having a highest ICP fitness score; and calculate the updated pose from the selected transformation.

18. The non-transitory electronic device readable medium of claim 17, wherein the software that when executed is operable to determine the updated poses of the mobile device is further operable to:

for each updated pose,
assume the mobile device is at the most recently determined pose, the most recently determined pose being the initial pose or a previously determined updated pose, apply the ICP algorithm to compare the live point cloud positioned at the most recently determined pose against the portion of the pre-captured point cloud, the comparison yielding a transformation, and calculate the updated pose from the transformation.

19. An apparatus for tracking a mobile device within a building, comprising:

a wireless network interface configured to receive signals;
one or more sensors configured to capture a live point cloud of surroundings of the apparatus;
a display screen;
a processor; and
a memory configured to store tracking software and an augmented reality (AR) application executable on the processor, the tracking software, when executed, operable to:

determine a course position estimate of the apparatus based on the signals received by the wireless network interface, the course position estimate indicating a room of a building in which the mobile device is located, access a portion of a pre-captured point cloud of the interior of the building that serves as a reference, the portion of the pre-captured point cloud corresponding to the indicated room, and determine poses of the apparatus based on a comparison of the live point cloud to the portion of the pre-captured point cloud, and the AR application, when executed, operable to:
generate an AR view of the interior of the building based on the poses, and
display the AR view on the display screen.

20. The apparatus of claim 19, wherein the tracking software that determines poses of the apparatus is operable to:

assume the apparatus is at each of a plurality of potential positions within the indicated room, apply an iterative closest point (ICP) algorithm to compare the live point cloud positioned at each of the potential positions against the portion of the pre-captured point cloud, each comparison yielding a transformation associated with a score that indicates how closely the live point cloud, when so transformed, matches the portion of the pre-captured point cloud, select a transformation having a highest score,
calculate an initial pose from the selected transformation,
assume the mobile device is at the most recently determined pose, the most recently determined pose being the initial pose or a previously determined updated pose, apply the ICP algorithm to compare the live point cloud positioned at the most recently determined pose against the portion of the pre-captured point cloud, the comparison yielding a further transformation, and calculate an updated pose from the further transformation.

* * * * *

UNITED STATES PATENT AND TRADEMARK OFFICE
CERTIFICATE OF CORRECTION

PATENT NO. : 9,918,204 B1  
APPLICATION NO. : 14/962725  
DATED : March 13, 2018  
INVENTOR(S) : Stéphane Côté et al.

Page 1 of 1

It is certified that error appears in the above-identified patent and that said Letters Patent is hereby corrected as shown below:

In the Specification

Column 5, Line 45 delete:
"position of the mobile deco vice 100 based on the known"
Insert:
--position of the mobile device 100 based on the known--

Signed and Sealed this
Seventeenth Day of March, 2020

Andrei Iancu
*Director of the United States Patent and Trademark Office*